United States Patent [19]

Ishii et al.

[11] Patent Number: 4,457,488
[45] Date of Patent: Jul. 3, 1984

[54] SLUICE VALVE ARRANGEMENT

[75] Inventors: Hiroshi Ishii, Tokyo; Hiroshi Morii; Saburo Isdhijima, both of Yokohama, all of Japan

[73] Assignee: Japan Oxygen Co., Ltd., Japan

[21] Appl. No.: 386,779

[22] Filed: Jun. 9, 1982

[51] Int. Cl.³ ............................................. F16K 31/02
[52] U.S. Cl. .................................... 251/133; 251/161; 251/175
[58] Field of Search ............... 251/160, 161, 175, 187, 251/188, 133; 49/40, 41

[56] References Cited

U.S. PATENT DOCUMENTS

| | | | |
|---|---|---|---|
| 2,649,275 | 8/1953 | Noyes | 251/160 X |
| 2,864,133 | 12/1958 | Younger | 49/40 |
| 3,343,562 | 9/1967 | Combes | 251/187 X |
| 3,485,475 | 12/1969 | Moore | 251/188 X |
| 3,585,757 | 6/1971 | Bitchie | 49/40 X |
| 3,591,135 | 7/1971 | Miller | 251/175 X |
| 3,717,322 | 2/1973 | Bernard | 251/175 X |

FOREIGN PATENT DOCUMENTS 2041497  8/1980  United Kingdom ............... 251/175

Primary Examiner—Harold W. Weakley
Attorney, Agent, or Firm—Cantor and Lessler

[57] ABSTRACT

A sluice valve arrangement is adapted to make an airtight partition or communication between a vacuum treatment chamber and the atmosphere or a pre-chamber. This arrangement includes a valve seat member comprising a cylindrical or spherical member having therein an opening, a pair of guide rails attached to the inner circumference of the seat member, a valve member movably supported on the guide rails, and means for air-tight engagement of the valve member and the valve seat portion of the seat member. The valve member has a curvature equal to that of the cylindrical or spherical member, and the engagement means comprises a plurality of bellows expandable by a compressed gas or air.

5 Claims, 9 Drawing Figures

SLUICE VALVE ARRANGEMENT

BACKGROUND OF THE INVENTION

The present invention relates to a sluice valve arrangement, and more particularly to a sluice valve arrangement of the type which is designed to open an opening through which a workpiece is fed into a vacuum chamber, or to air-tightly close the opening so as to treat the workpiece in the vacuum chamber in a hermetic state.

In the treatment of a workpiece under vacuum, for example, in the vacuum drying of workpieces or the vacuum brazing of metals, various sluice valve arrangements have been used to permit easy feeding of workpieces into vacuum chambers, and to provide hermetic closing of the openings through which the workpieces have been supplied into the vacuum chambers, thereby effectively keeping the vacuum chambers in an air-tight state. One typical example of the sluice vlave arrangements is designed to be opened or shut between a vacuum chamber and a pre-chamber put in communication therewith so as to reduce the amount of open air entering into the vacuum chamber as much as possible, in the case of supplying or discharging a workpiece into or out of the vacuum chamber.

Referring to FIG. 1, an opening or shutting sluice valve arrangement 4 (4') is disposed between a vacuum chamber 1 and a pre-chamber 2 (3) put in communication with the vacuum chamber 1.

With the arrangement of this type, the vacuum chamber is invariably maintained at a desired pressure. The sluice valve 4 (4') is hermetically closed to render the pressure in the pre-chamber 2 (3) substantially equal to that in the vacuum chamber 1, and then manipulated to put the prechamber 2 (3) in communication with the vacuum chamber 1, while the said pressure is maintained. Thereafter, feeding or discharging the workpiece into or out of the vacuum chamber 1 is effected.

The said sluice valve arrangement 4 (4') should have a passage of a greater sectional area because of the need of feeding the workpiece into both the vacuum chamber 1 and the pre-chamber 2 (3). With this arrangement, it is further required to reduce the interval between the flanges as much as possible so as to enable the workpiece to be delivered without using any delivery system in the arrangement.

This is the reason why use has heretofore been made of the sluice type valve arrangement employing a flat valve member, as will be understood from FIG. 2.

This sluice type valve arrangement is constructed from a valve box B including a passage F provided on its edge with flanges A and a flat valve member D disposed hermetically in a guide groove C in such a manner that it is vertically or horizontally slidable thereon. The passage F is opened and shut by the valve member D driven by a driving mechanism E. The valve box B includes a housing G designed to accommodate the valve member D when it is opened, and to maintain the passage F in a hermetic state. The housing G is kept under vacuum as mentioned above, and receives atmospheric pressure on its outer wall. To this end, the outer wall of the housing G should be of the structure sufficient to resist to atmospheric pressure, and is usually reinforced with a latticed material H, as illustrated.

When the said material is attached to the valve box B as by welding, however, there is a fear that it may suffer distortion and deformation due to heat.

When the passage F is shut by the valve member D, and the pre-exhaust chamber is expanded to atmospheric pressure, a load is applied on the valve member D. Due to its flatness, the valve member D may be distored by a vacuum load applied thereon, rendering its opening or shutting difficult and its hermetic closing more impossible. It has been found that as the diameter of the passage F increases, such problems are more likely to arise.

SUMMARY OF THE INVENTION

The present invention has for its main object to provide a solution to the aforesaid problems, and is characterized by the provision of a novel sluice valve ararangement capable of making a hermetic partition between a vacuum chamber and the atmosphere or a pre-chamber by its closing movement.

According to the present invention, this object is achieved by the provision of a sluice valve arrangement adapted to open or shut an opening leading to a vacuum chamber, including a valve seat member comprising a cylindrical or spherical member having therein an opening, a guide rail attached to the inner circumference of said valve seat member, a valve member movably supported on said guide rail, and means for air-tight engagement of said valve member with the valve seat of said seat member.

BRIEF DESCRIPTION OF THE DRAWINGS

This and other objects and features of the present invention will be come apparent from a reading of the following detailed description with reference to the accompanying drawings, in which:

FIG. 6 is a sectional view of the guide rail for the valve member forming part of the sluice valve arrangement according to the present invention, and FIGS. 7 to 9 inclusive are views illustrative of another embodiment of the present invention, wherein

DETAILED DESCRIPTION OF PREFERRED EMBODIMENTS

Preferred embodiments of the present invention will now be explained with reference to FIGS. 3 to 9 inclusive.

Referring first to FIGS. 3 to 6 inclusive, there is shown one embodiment of the present invention, wherein a cylindrical member is used as the valve seat member.

Figure 1:
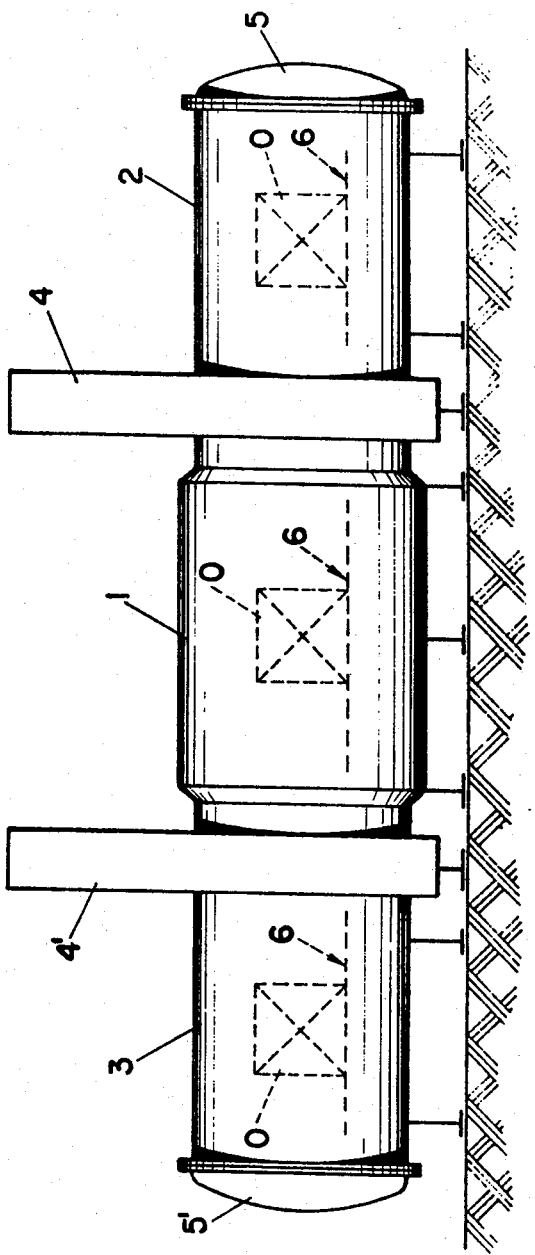
FIG. 1 is a view illustrative of the prior art vacuum treatment system.
Figure 2:
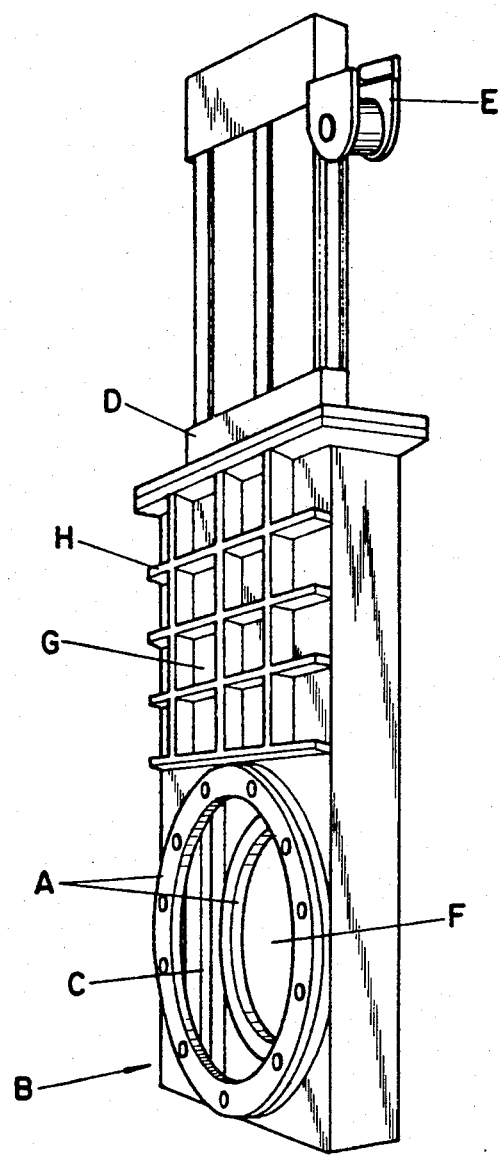
FIG. 2 is a view illustrative of the prior art sluice valve arrangement used with the system of FIG. 1.
Figure 3:
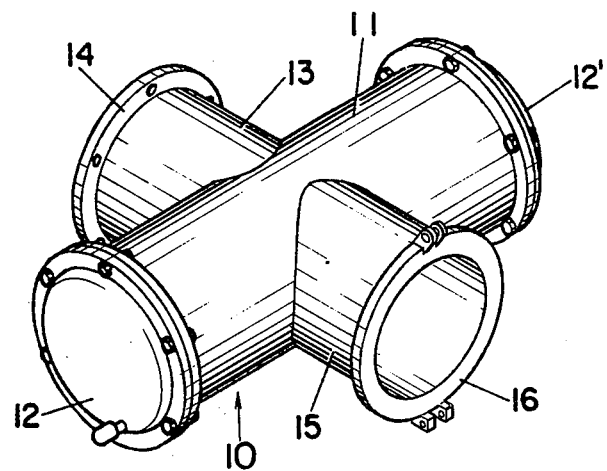
FIG. 3 is a schematical view of one embodiment of the preexhaust chamber provided with the sluice valve arrangement according to the present invention.
Figure 4:
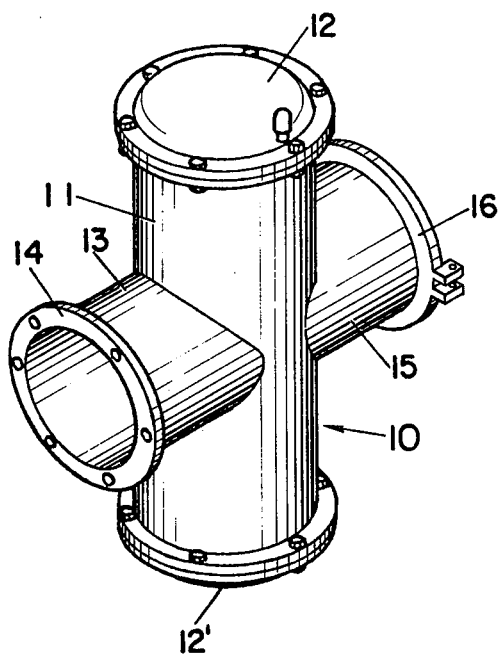
FIG. 4 is a schematical view illustrative of another embodiment of the pre-exhaust chamber provided with the sluice valve arrangement according to the present invention.

FIGS. 3 and 4 are perspective views illustrative of a pre-chamber to be connected to a vacuum chamber, which is incorporated with the inventive sluice valve arrangement. The pre-chamber, generally shown at 11, is formed of a cylindrical member 10, and has both its ends air-tightly sealed with arched coverings 12 and 12'. A connector pipe, for instance, shown at 13, is to be joined to the vacuum chamber, and has one end flanged at 14 and the other end mounted on the circumference of the barrel portion of the cylindrical member 10 in such a manner that the axis of the connector pipe is at a right angle to that of the member 10 forming the pre-chamber 11. Preferably, the axis of the barrel portion of the pre-chamber 11 is kept in a horizontal state (FIG. 3), or alternatively in a vertical state (FIG. 4). A pipe 15 is provided for the introduction of a workpiece into the pre-chamber 11, and has at its one end a flange 16 to which a covering (not shown) is attached. This pipe 15 is held in a given position on the circumference of the pre-chamber 11, which position is opposite to the pipe 13.

Figure 5:
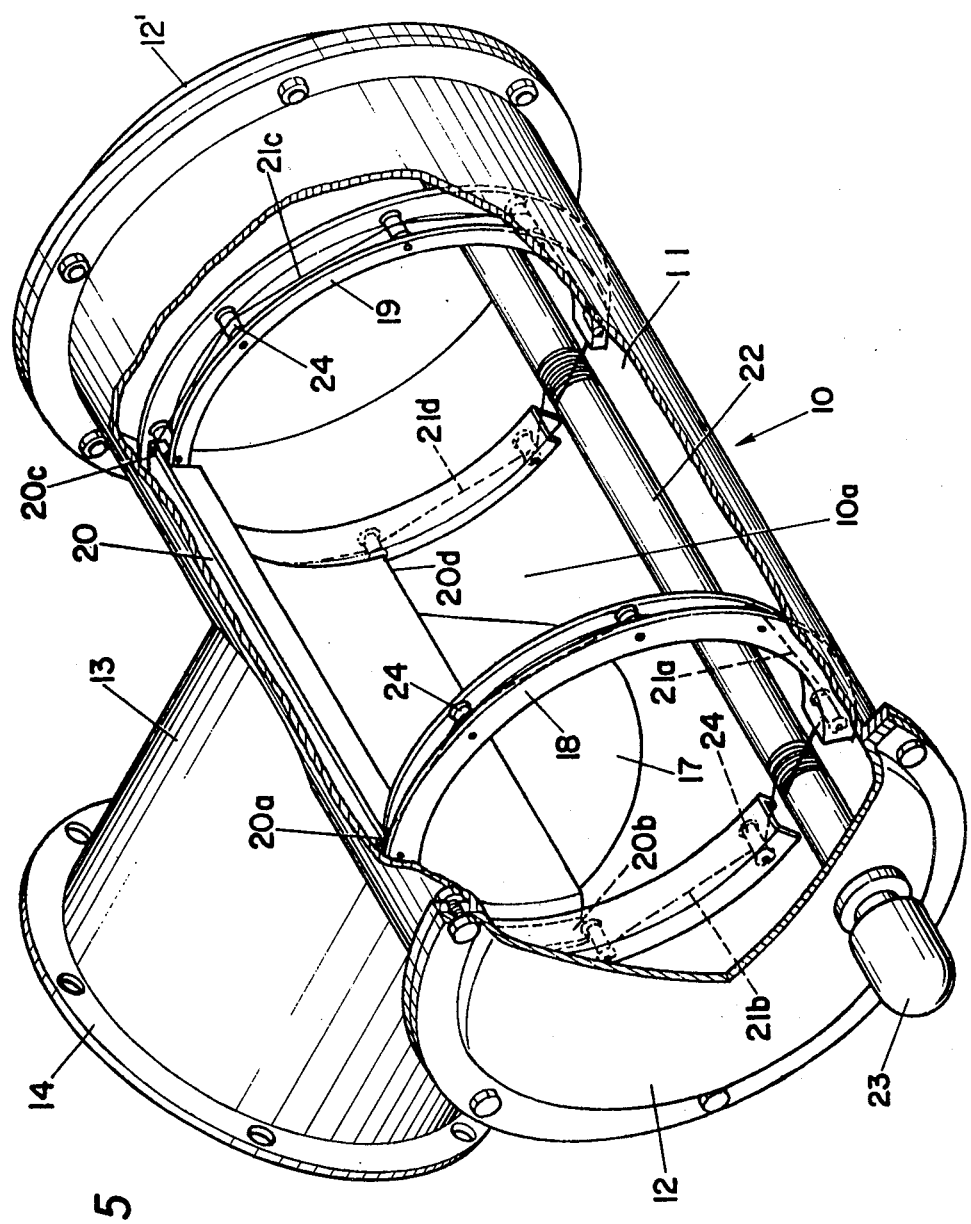
FIG. 5 is a partially cut away, enlarged view of the pre-exhaust chamber for the illustration of the sluice valve arrangement according to the present invention.
Figure 6:
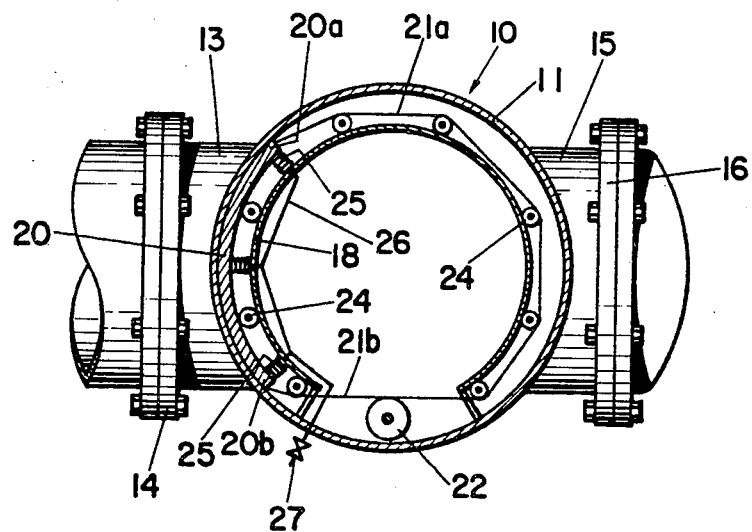

As illustrated in FIGS. 5 and 6, the inventive sluice valve arrangement is placed in an opening 17 through which the connector pipe 13 is in communication with the pre-chamber 11.

FIG. 5 is a partially cut away, enlarged view of the pre-chamber 11, and FIG. 6 is a sectional view of the side portion of a guide rail.

The present invention will now be explained with reference to the case where the axis of the pre-chamber 11 is kept in a horizontal state.

Guide rails 18 and 19 are positioned on both sides of the openings 17, and mounted on the inner circumference of the pre-chamber 11. Care should then be taken of the size of the opening 17, to which is attached the end of the pipe 13. A curved valve member 20 has a curvature equal to that of the inner circumference of the cylindrical member forming the pre-chamber 11, and is suspensorily supported at both its ends on the guide rails 18 and 19 in a slidable manner. Chains or wire ropes (hereinafter referred to as the wire ropes) 21a and 21b, and 21c and 21d are fastened around the guide rails 18 and 19. The wire ropes 21a–21d have their one ends fixed to the relative corners 20a–20d of the valve member 20. The other end portions of the wire ropes 21a and 21b, or 21c and 21d are combined together under tension, and tightly wound around a wind-up rotor 22 which is rotatably mounted on the bottom of the pre-chamber 11 along its axis. The windup rotor 22 is driven by a driving motor 23 connected to the end of an extension thereof. A plurality of pulleys 24 are arranged at given intervals in the guide rails 18 and 19, serving to provide easy movement of the valve member 20 and functioning as guides for the wire ropes 21a–21d.

Between the guide rails 18, 19 and the valve member 20, there is a mechanism for the hermetic engagement of the valve member 20 with a valve seat member 10a. As illustrated in FIG. 6, the mechanism comprises a plurality of bellows 25 provided in the portions of the guide rails 18 and 19, which portions correspond to the opening 17. The bellows 25 are connected with each other by a suction/exhaust pipe 26 extending air-tightly through the wall of the pre-chamber 11 to a valve 27. To permit air-tight shutting of the opening 17 by the valve member 20, an amount of compressed air is supplied to the bellows through the valve 27, so that the bellows 25 are expanded to engage the valve member 20 with the inner wall of the pre-chamber 11, thereby closing the pre-chamber 11.

It is understood that while the engagement mechanism has been described as comprising a plurality of bellows, other mechanical engagement mechanisms may be applied as well.

The foregoing sluice valve arrangement operates as follows.

To permit air-tight closing of the opening 17 of the pipe 13 leading to the vacuum chamber, an amount of compressed air is introduced into the bellows 25 through the pipe 26 by manipulation of the external valve 27 to expand the bellows 25 and give a push to the valve member 20 with the bellows, thereby providing air-tight engagement of the valve member 20 with the inner wall of the pre-chamber 11.

In order to allow the pre-chamber 11 to communicate with the vacuum chamber through the opening 17, an amount of compressed air supplied into the bellows 25 is discharged to atmospheric pressure or, preferably, reduced pressure, so that the valve member 20 disengages from the inner wall of the pre-chamber due to the contraction of the bellows 25. The valve member 20 is then movable, and the driving motor 23 is driven clockwise. As a result, the wind-up rotor 22 connected to the motor 23 is rotated clockwise so that, of the wire ropes 21a–21d wound therearound, the ropes 21a and 21c are further rolled, while the ropes 21b and 21d are unrolled. The valve member 20 is guided by the rails 18 and 19 due to the tension of the wire ropes 21a and 21c and the relaxation of the wire ropes 21b and 21d, and moved up along the inner wall of the hollow cylinder forming the prechamber 11.

It will be noted that a plurality of pulleys 24 arranged in the guide rails 18 and 19 ensure extremely smooth sliding movement of the valve member 20.

To again close the pre-chamber by the valve member 20, the driving motor 23 is reversed to fasten further the wire ropes 21b and 21d around the wind-up rotor 22 and, at the same time, to unroll the wire ropes 21a and 21c. The wire ropes 21b and 21d give a pull to the valve member 20, while the wire ropes 21a and 21c relax, whereby the valve member 20 is guided by the rails 18 and 19, and moved down along the inner circumference of the cylindrical pre-chamber until it closes the opening 17. An amount of compressed air is thereafter supplied into the bellows 25 through the valve 27, so that the valve member 20 is again engaged with the inner wall of the prechamber 11 due to the expansion of the bellows 25. As a consequence, the valve member 20 air-tightly closes the opening 17.

In the foregoing embodiment, the hollow cylinder forming the pre-chamber 11 is arranged with its axis being horizontally positioned, and connected at the periphery of its barrel portion with the connector pipe 13, as shown in FIG. 3. According to the present invention, however, the hollow cylinder may be arranged with its axis being vertically positioned, and connected at the periphery of its barrel portion with the connector pipe 13 leading to the vacuum chamber. The valve member is then horizontally moved along the inner circumference of the barrel portion to open or shut the opening in the pre-chamber.

Figure 7:
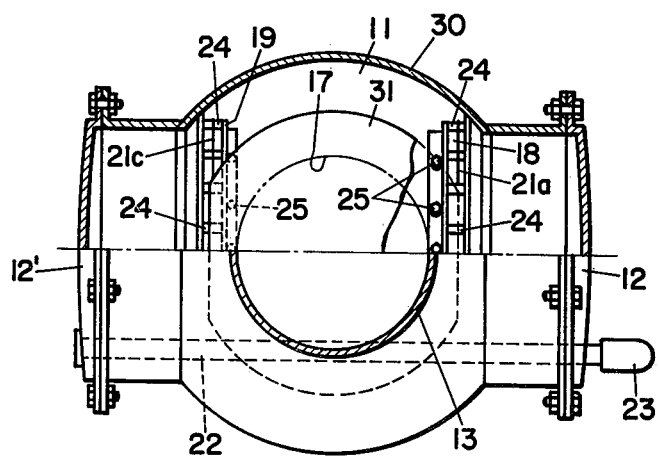
FIG. 7 is a partially cut away sectional view.
Figure 8:
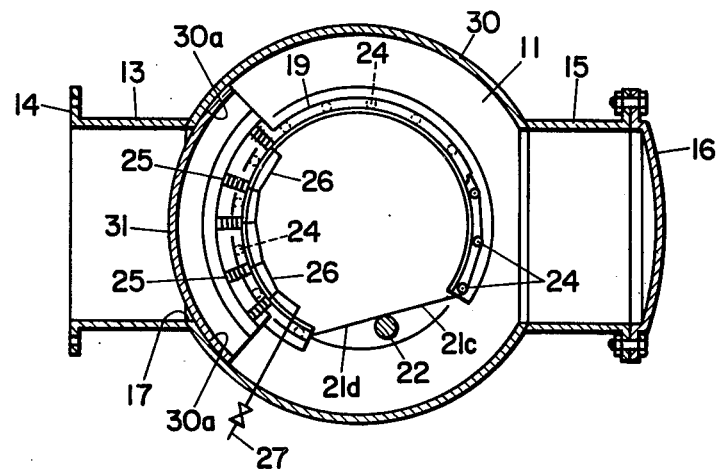
FIG. 8 is a cut away front view.
Figure 9:
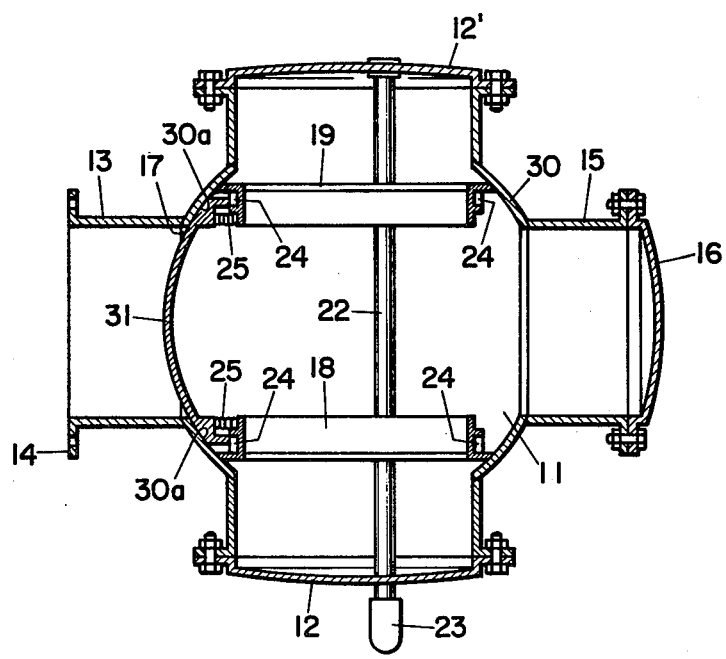
FIG. 9 is a cut away plan view.

Another embodiment of the present invention, wherein a hollow sphere is used as the valve seat member, will now be explained with reference to FIGS. 7 to 9 inclusive.

A pre-chamber 11 is defined by the interior of the hollow sphere, and is provided with a connector pipe 13 leading to a vacuum chamber. Guide rails 18 and 19 are arranged on both sides of an opening 17 and along the inner circumference of the barrel portion of the pre-chamber 11. A curved valve member 31 has a curvature equal to that of the inner circumference of the spherical pre-chamber 11, and is suspensorily supported at both its ends on the guide rails 18 and 19 in a slidable manner. The valve member 31 is adapted to be engaged with a valve seat portion 30a surrounding the opening 17.

It will be appreciated that other parts or means are substantially similar to those of the first embodiment.

EFFECTS OF THE INVENTION

With the arrangement as described above and defined in the appended claims, it is possible to avoid distortion of the valve member due to vacuum or other loads applied thereon to an extremely high degree, since the valve member of the present invention has an improved strength over the prior art flat valve. Accordingly, the valve member always serves to open or shut properly the opening without any malfunction.

As the inner circumference of a cylindrical or spherical body is used as the valve seat portion, that body per se can be applied as a pre-chamber, and the sluice valve arrangement can be incorporated into the pre-chamber in such a manner that the valve member is movable along the inner circumference thereof. It is thus unnecessary to provide for a separate valve assembly and to incorporate it into the associated system, resulting a saving of labor and space. In addition, since the present invention dispenses with any housing for the valve member, it is very unlikely that leakage and breakdown problems may arise.

As mentioned above, the present invention ensures airtight closing or opening of the valve member, which is adapted to make a hermetic partition or communication between the vacuum chamber and the atmosphere or the pre-chamber. The valve member is also so strong that any reinforcing work or material can be dispensed with.

What is claimed is:

1. A sluice valve arrangement adapted to open or shut an opening portion through which a workpiece is led into or out of a vacuum chamber comprising:
   (A) a housing having a curved inner surface defining a valve seat portion and having an inlet and an outlet;
   (B) a pair of spaced-apart guide rails attached to the inner circumference of said housing on either side of said outlet;
   (C) a curved valve member slidingly supported on said guide rails for rotary movement;
   (D) the curvature of said valve member being substantially equal to that of said curved surface;
   (E) air-tight engagement means comprising a plurality of bellows expandable by compressed gas to push said valve member to the valve seat portion of said curved surface; and
   (F) actuating means for said valve member.

2. A sluice valve arrangement as recited in claim 1, in which said housing having a curved surface is a hollow cylindrical member.

3. A sluice valve arrangement as recited in claim 1, in which said housing having a curved surface is a hollow sphere member.

4. A sluice valve arrangement as recited in claim 1, in which said actuating means comprises a wire rope wound around each of the guide rails and sliding on pulleys arranged in said guide rails, and operatively connected to drive means.

5. A sluice valve arrangement as recited in claim 4, wherein said drive means is an electric motor.

* * * * *